United States Patent [19]

Mitoff

[11] 4,049,885
[45] Sept. 20, 1977

[54] CONSTRUCTION FOR SOLID ELECTROLYTE IN SODIUM/SULFUR BATTERY

[75] Inventor: Stephen Paul Mitoff, Clifton Park, N.Y.

[73] Assignee: Electric Power Research Institute, Inc., Palo Alto, Calif.

[21] Appl. No.: 731,170

[22] Filed: Oct. 12, 1976

[51] Int. Cl.² .............................................. H01M 6/18
[52] U.S. Cl. ..................................... 429/104; 429/191
[58] Field of Search ..................... 429/104, 27, 30, 12, 429/72, 191, 211, 17

[56] References Cited

U.S. PATENT DOCUMENTS

| | | | |
|---|---|---|---|
| 3,533,848 | 10/1970 | Winn | 429/30 X |
| 3,647,542 | 3/1972 | Berger | 429/27 |
| 3,833,420 | 9/1974 | Will | 429/104 |
| 3,840,405 | 10/1974 | Poirier et al. | 429/30 |

Primary Examiner—Anthony Skapars
Attorney, Agent, or Firm—Townsend and Townsend

[57] ABSTRACT

A high surface area short diffusion path sodium/sulfur cell is provided having a plurality of half-cells in spaced-apart planes extending through the block in a first direction with a second group of half-cells in the planes intermediate the planes of the first group of half-cells extending through the block in a direction normal to the direction of the first group of half-cells. The construction is strong and stable, provides for large surface area contact with the cell reactants and avoids narrow passageways which result in high resistance. The sodium and sulfur can be circulated through the active cell volume during charging and discharging of the battery permitting large storage capacity. Current collection can be achieved employing graphite fibers twisted between aluminum wires, with the aluminum wires welded to an aluminum manifold.

6 Claims, 6 Drawing Figures

CONSTRUCTION FOR SOLID ELECTROLYTE IN SODIUM/SULFUR BATTERY

BACKGROUND OF THE INVENTION

1. Field of the Invention

This invention was made under contract with or supported by the Electric Power Research Institute.

Sodium-sulfur solid electrolyte batteries provide numerous advantages over other types of batteries. The sodium and sulfur are low molecular weight and therefore provide greater power storage capability per unit weight as compared to lead or nickel batteries. In addition, the active materials can be stored outside of the cell and be circulated through the active cell. Thus, theoretically a small battery cell can have infinite storage capacity. However, due to the peculiar nature of the battery in having liquid electrodes and a solid electrolyte, many technological problems are encountered in developing a battery which is stable, efficient, and safe.

One of the difficulties with the sodium-sulfur battery is high internal resistance. It is therefore desirable to maximize the solid-liquid interface. It is also desirable to reduce the diffusion path length in the liquid reactants. Other considerations are ease of heat transfer, fabrication, current collection in the sulfur cell and ease of introduction and removal of the anolyte and catholyte.

2. Description of the Prior Art

U.S. Pat. Nos. 3,647,542 and 3,661,644 each describe honeycomb matrices for batteries. U.S. Pat. No. 3,839,090 describes a current collector.

See also U.S. Pat. Nos. 3,423,243, 3,661,644 and 3,647,542.

SUMMARY OF THE INVENTION

A strong mechanically stable ceramic structure of β-alumina is provided having thin walls and a large surface area for the solid-liquid interface. A β-alumina block is provided having a plurality of parallel half-cells in spaced-apart planes in a first direction for the negative electrode reactants and a plurality of positive electrode half-cells in the planes intermediate the negative electrode half-cells in a direction normal to the direction of the negative electrode half-cells. This configuration allows for storage of the negative electrode reactants and positive electrode reactants outside of the block and introduction into the battery block as required. Current collection is achieved with the positive electrode reactants employing graphite fibers twisted between aluminum wires, which are then welded to an aluminum manifold. The sodium half-cells are connected to a reservoir sealed to the top of the ceramic block. The sulfur-polysulfide half-cells are connected to shallow metallic manifolds at each end, each manifold having a tube leading to a single main reservoir placed in a position in such a way that the upper channels are never drained of polysulfide.

DESCRIPTION OF THE SPECIFIC EMBODIMENTS

Figure 1:
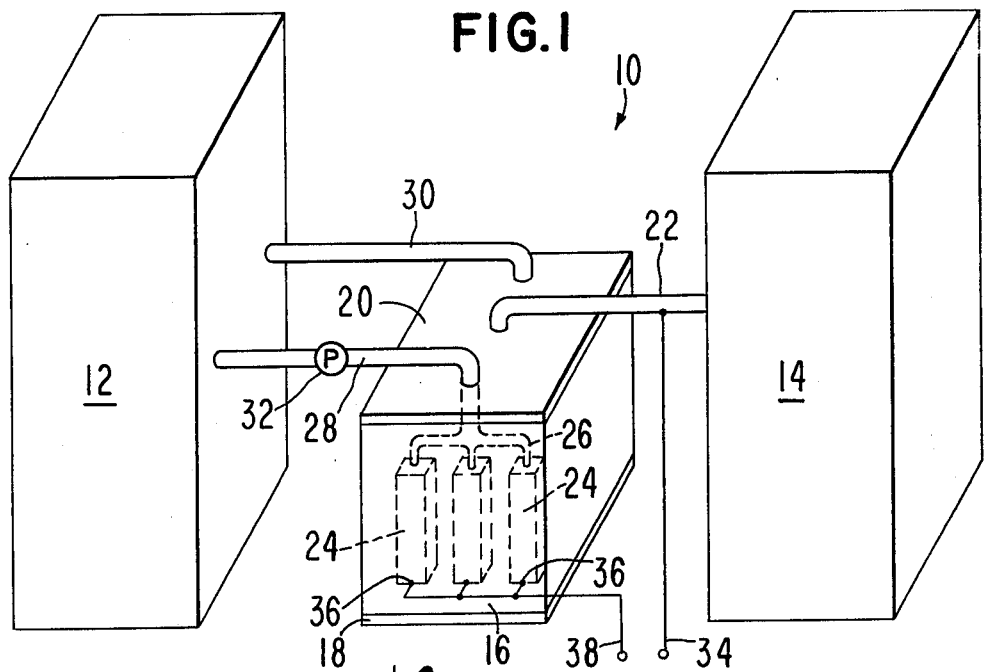
FIG. 1 is a perspective view partially diagrammatic of a sodium/sulfur battery with electrode storage.

A sodium-sulfur battery is provided employing a ceramic block of a solid electrolyte, normally β-alumina. The block has a plurality of slot-shaped passageways extending through the block, with slots in alternate layers containing sodium and sulfur. The positive electrode reactants slots are preferably horizontal, while the negative electrode reactants slots are vertical. Thus, the positive electrode reactants slots are in a direction normal to the direction of the negative electrode reactants slots, with the openings to the slots for the positive electrode reactants and negative electrode reactants being at different faces.

The current collector in the positive electrode reactants slots is fabricated from fibers of graphite entwined in twisted wires, similar to pipe cleaners or test tube brushes in construction. See U.S. Pat. No. 3,839,090, which description of the current collector is incorporated herein by reference. The twisted wires are aluminum, which has excellent corrosion resistance to sulfur and sodium polysulfide. Aluminum in molten sulfur forms a protective but resistive coating. Because the graphite and aluminum are very tightly bound, the resistive layer will not penetrate this interface. The aluminum wires are welded to aluminum caps connected to a manifold.

The solid electrolyte block, normally β-alumina, can be fabricated by hydrostatically pressing a solid cylinder of β-alumina powder. The cylinder is prefired in a dry oxidizing atmosphere to obtain strength for machining. The prefired material is then machined using diamond cutting wheels and ultrasonic drills to provide the desired size, shape and slots. After machining, the piece is fired at a higher temperature to obtain the final density. The sodium and sulfur reservoir connections are then sealed mechanically under pressure to provide hermetic seals to the block.

The size of the block will vary depending upon the power to be generated, fabrication equipment and the like. With a one inch cube, the sulfur passageways would have an oval cross-section of approximately ⅜ inch length (long axis) and ¼ inch in width (short axis), while the sodium passageways would have an oval cross-section of the same length and be of about 1/16 inch in width. The cross-sectional area of the sulfur passageway will generally be from about 1.5 to 3 times that of the sodium passageways. The larger sulfur slot dimension lowers the resistivity by having a larger area for the current collectors. Larger sized blocks could be fabricated with larger slots, although this would reduce the amount of interface between the liquid and solid. Therefore, the size of the passage ways is optimized to achieve a high surface area between the liquid and solid interface, without compromising the resistivity.

The passageways in a row will have only narrow spacing between successive passageways. The walls will be as thin as possible commensurate with structural stability. The spacing will generally be in the range of about 1/16 to ⅛ inch.

The vertical negative electrode slots would be closed at the bottom and contain sodium which extends to a reservoir sealed to the top of the ceramic block.

The horizontal slots which contain sulfur-polysulfide would be opened at each end for circulation. The sulfur-polysulfide channels would be connected to shallow metallic manifolds at each end, each with a tube leading to a single main reservoir placed in position in such a way that the upper channels would never be drained of polysulfide. The aluminum manifold connected to the current collecting wires would exit from the shallow metallic manifolds providing the sulfur-polysulfide channel through insulated openings and be joined to a common lead.

For further understanding of the invention, the drawings will now be considered. In FIG. 1, sodium-sulfur battery 10 is provided having sulfur storage reservoir 12 and sodium storage reservoir 14. A ceramic block 16 is provided having a non-conducting base 18, and sodium chamber 20 into which the sodium passageways in block 16 enter. Sodium chamber 20 is in fluid connection with sodium reservoir 14 by means of conduit 22. A plurality of shallow chambers 24 are provided on each side of block 16 for communication with the sulfur-polysulfide passage ways in block 16. Each of the shallow chambers is connected by means of manifold 26 to a common conduit 28 on one side of the block and common conduit 30 on the other side of the block 16. Pump 32 is provided for circulating the sulfur-polysulfide through the passage ways of block 16. Extending into the sodium is lead 34, while a plurality of connector leads 36, connected to the current collector manifolds for the sulfur-polysulfide, extend out of the shallow chambers 24 through insulated orifices and are connected to common lead 38. The leads 34 and 38 may be connected to a load or may be used for recharging the battery.

Figure 2:
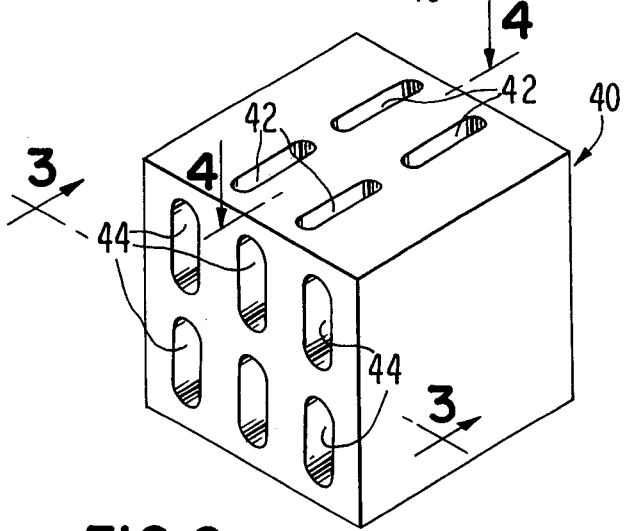
FIG. 2 is a perspective view of the ceramic block.
Figure 3:
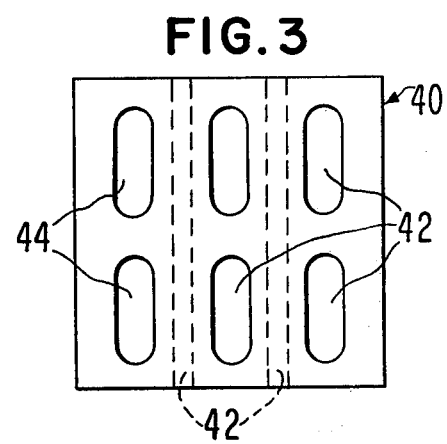
FIG. 3 is a horizontal cross-section along lines 3—3 of FIG. 2.
Figure 4:
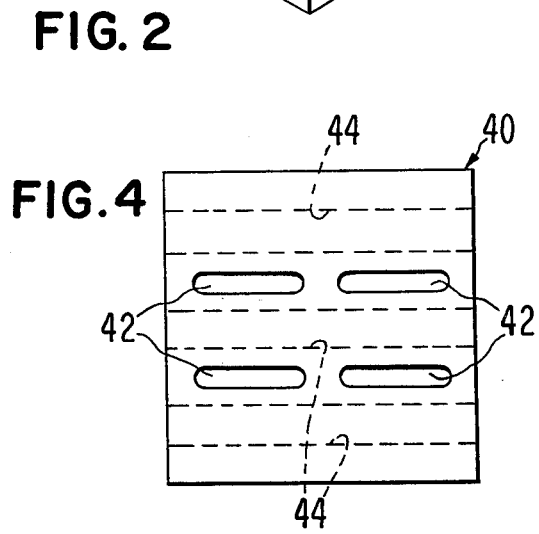
FIG. 4 is a vertical cross-section along lines 4—4 of FIG. 1.
Figure 5:
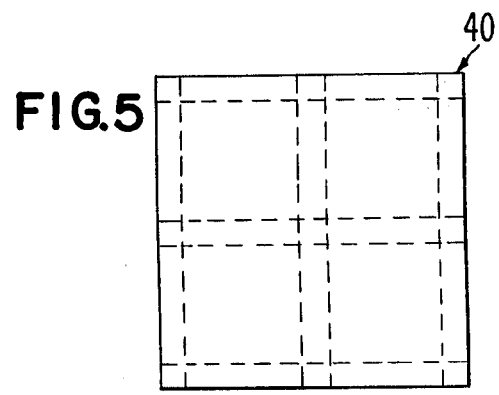
FIG. 5 is a diagramatic view showing the interfacing areas in cross-section.

Turning now to FIGS. 2, 3 and 4, the ceramic block 40 has a plurality of vertical oval passageways 42 which are employed for containing sodium. The sodium passageways 42 are in separated planes between horizontal sulfur pathways 44. The design provides for a large interface between the sodium and sulfur passageways as is depicted in FIG. 5. Thus, resistivity is minimized providing a high surface area short diffusion path cell construction.

Figure 6:
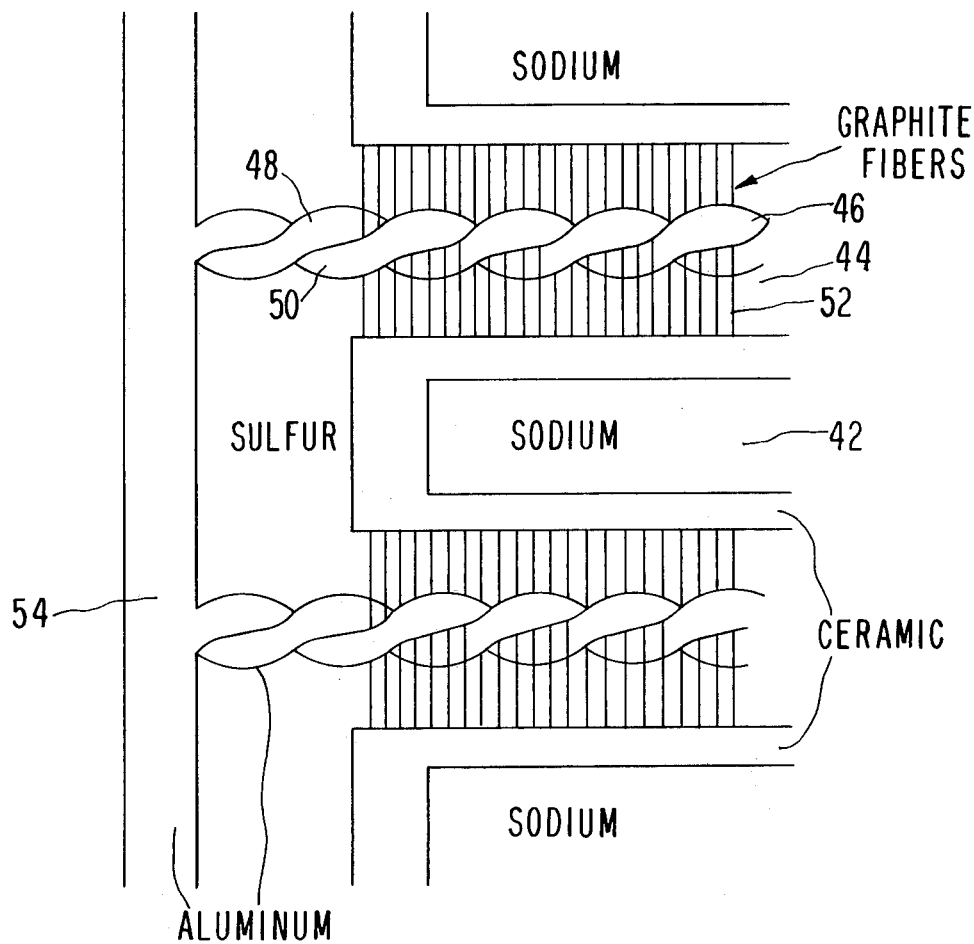
FIG. 6 is a schematic view of the current collectors in the positive electrode half-cell.

In FIG. 6 is depicted the current collector for the sulfur-polysulfide. In each sulfur passageway 44 is employed current collector 46, which employs two aluminum wires 48 and 50 which are twisted so as to grip graphite fibers 52. The graphite fibers extend into passageways 46. The pressure of the twisted wires prevents sulfur from being introduced between the fibers in the wires and destroying the electrical contact. The wires are then welded to aluminum manifold 54 which is connected to connector leads 36 for current collection to lead 38.

In accordance with the subject invention, a simple and efficient design is provided for a sodium-sulfur battery construction, which provides for ease of construction through a strong stable solid electrolyte ceramic block. In addition, the cell permits high storage capacity and large surface area interfacing between the cathode and anode. Furthermore, the cell provides for a short diffusion path, so as to reduce cell resistivity.

Although the foregoing invention has been described in some detail by way of illustration and example for purposes of clarity of understanding, it will be obvious that certain changes and modifications may be practiced within the scope of the appended claims.

What is claimed is:

1. A sodium-sulfur solid electrolyte battery wherein sodium is the negative electrode reactant and sulfur is the positive electrode reactant comprising:
    a ceramic block having a plurality of parallel half-cells in spaced-apart planes in a first direction for negative electrode reactant and in a second direction normal to said first direction for positive electrode reactant;
    means connected to said negative electrode half-cell for introducing negative electrode reactant into said negative electrode half-cell;
    means connected to said positive electrode half-cell for circulating positive electrode reactant through said positive electrode half-cell; and
    means for collecting current from said positive electrode reactant in said positive electrode half-cell.

2. A sodium-sulfur solid electrolyte battery according to claim 1, wherein said ceramic block is $\beta$-alumina and said positive electrode half-cell have a cross-section of from 1.5 to 3 times the cross-section of said negative electrode half-cell.

3. A sodium-sulfur solid electrolyte battery according to claim 1, wherein said ceramic block is $\beta$-alumina.

4. A sodium-sulfur solid electrolyte battery according to claim 3, wherein said means for collecting current from said positive electrode reactant in said positive electrode half-cell comprises aluminum wires twisted about graphite fibers.

5. A sodium-sulfur solid electrolyte battery, wherein sodium is the negative electrode reactant and sulfur is the positive electrode reactant comprising: a $\beta$-alumina block having a plurality of oval half-cells in spaced-apart planes in a first direction for negative electrode reactant and in a second direction normal to said first direction for positive electrode reactant;
    means connected to said negative electrode half-cell for introducing negative electrode reactant into said negative electrode half-cell;
    a negative electrode reactant reservoir connected to said negative electrode reactant introducing means;
    means connected to said positive electrode half-cell for circulating positive electrode reactant through said positive electrode half-cell;
    a positive electrode reactant reservoir connected to said positive electrode reactant circulating means; and
    means for collecting current from said positive electrode reactant in said positive electrode half-cell.

6. A sodium-sulfur solid electrolyte battery according to claim 6 wherein said current collecting means in said positive electrode half-cell comprises aluminum wires twisted about graphite fibers, wherein said aluminum wires are connected at one end to a conductive manifold.

* * * * *